UNITED STATES PATENT OFFICE.

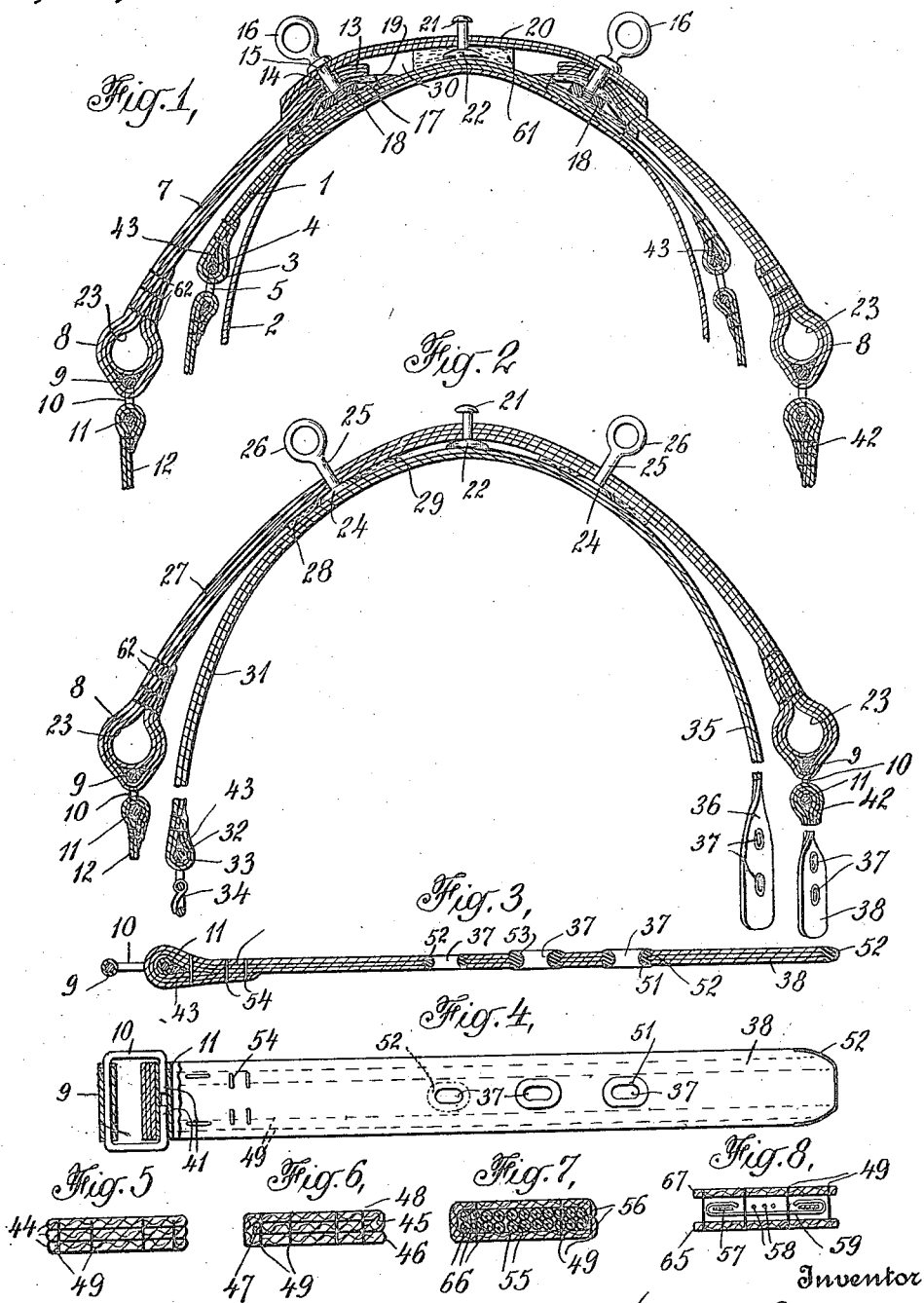

HENRY C. EGERTON, OF RIDGEWOOD, NEW JERSEY.

HARNESS.

1,419,450.    Specification of Letters Patent.    Patented June 13, 1922.

Application filed October 15, 1918. Serial No. 258,281.

*To all whom it may concern:*

Be it known that I, HENRY C. EGERTON, a citizen of the United States, and resident of Ridgewood, county of Bergen, State of New Jersey, have made a certain new and useful Invention Relating to Harness, of which the following is a specification, taken in connection with the accompanying drawing.

This invention relates to harness elements, such as jack saddles, straps, etc., in which cotton or other woven or braided fabric, cords, ropes, or fibrous material such as canvas impregnated with cured phenolic condensation cementing material is substituted for leather elements. Straps or other harness members may in some cases be formed of one or more layers of heavy woven or braided webbing or fabric carrying and preferably quite thoroughly impregnated with cured phenolic condensation cementing material, such as bakelite, condensite or redmanol varnish compositions which greatly increase the strength of the fabric as well as render it practically waterproof. Where relatively little flexibility is required as in jack saddles adjacent the saddle ring members hard curing phenolic condensation cementing material of this general character may be used, such as bakelite varnish No. 1 which when present to the extent of thirty to sixty per cent or so in such cured impregnated fabric renders it relatively rigid and gives it a strength of something like 10,000 to 20,000 pounds per square inch section. Where, however, a greater degree of flexibility is desirable as in the flexible flaps, straps or other members of jack saddles or other harness elements, phenolic condensation cementing material may be rendered more flexible and elastic when cured by incorporating suitable proportions of waxy, oily or other softening material therewith. A convenient way of preparing such soft curing phenolic condensation cementing material is by incorporating suitable proportions of the softening agent in bakelite varnish compositions and where bakelite varnish No. 1 is mixed with castor oil, for instance, so that fifteen to thirty per cent of the castor oil is present in the mixture sufficient flexibility is secured for most purposes when canvas or similar fibrous material is impregnated therewith and cured under proper conditions. It is in many cases desirable to reenforce, stiffen and strengthen buckle holes, connecting and other parts of flexible harness members of this general character such as straps and the like whose body portions are rendered flexible by impregnating the cloth or other fibrous material with such soft, curing phenolic condensation cementing material. Such connecting and other portions may be conveniently reenforced by impregnating these parts of the fabric member with harder curing phenolic condensation cementing material containing considerably less of the incorporated softening agent, and in many cases buckle holes, strap ends and other parts may advantageously be impregnated or coated with regular hard curing bakelite varnish or similar cementing material where the relative stiffness is not a serious disadvantage. Metallic and other reenforcements may of course be used at points where great wear or strain occurs and metallic eyelets, tubes and other forms of metal reenforcement may be conveniently cemented and incorporated in such fabric elements, preferably by the use of hard curing phenolic condensation cementing material of this general character. One method of reenforcement for buckle holes or the like is to incorporate in the adjacent fabric a mixture of finely divided strip or fibrous steel or other metal which when mixed with phenolic condensation cementing material and cured into the fabric therewith considerably strengthens the fabric and greatly increases its wear resisting properties especially where it engages metal elements.

In the accompanying drawing showing in a somewhat diagrammatic way illustrative embodiments of the invention, Fig. 1 is a transverse vertical section through a jack saddle and related parts.

Fig. 2 is a similar view showing a modified construction.

Fig. 3 is an enlarged longitudinal section through a strap.

Fig. 4 is a top view thereof, parts being shown in section; and

Figs. 5 to 8 are transverse sections showing various forms of strap or other elements, Fig. 8 showing the parts in separated position for greater clearness.

The jack saddle indicated may be formed of a number of connected layers or strips of any suitable fabric such as cotton duck or heavy woven or braided tape or webbing, heavy closely woven cotton webbing giving satisfactory results and being of course where preferred previously dyed or colored and the incorporated phenolic condensation cementing material similarly colored where it is preferred to have the harness elements of a uniform color and to minimize the textured appearance of such fabric elements. The support members 1 and 7 for the girth and tug straps may be formed of a number of layers of such fabric which has preferably been coated or impregnated with such phenolic condensation cementing material as desired and as shown in Fig. 1 by the heavy cross hatching thereof these elements may in some cases be quite thoroughly impregnated with regular hard curing phenolic condensation cementing material, such as bakelite varnish No. 1 and the fabric dried before being assembled preferably after being sufficiently heated to soften the cementing material and render the fabric flexible. The heavy supporting member 1 may as indicated be carried directly across the saddle and may have the tubular connector members 4 incorporated therewith, the space around these members where the ends of the fabric are brought together and preliminarily stitched, if desired, being filled with similarly impregnated small strips of fabric or other fibrous material 43, such as cotton waste or cotton fibre similarly impregnated. If desired, a guard flap 2 comprising one or more layers of such fabric impregnated with similar phenolic condensation cementing material may be used below this support 1 and the edges of this relatively thin and flexible member may be rendered still more flexible, if desired, by having a suitable proportion of castor oil or other softening agent in the impregnating cementing material. Whereas indicated the tug straps 7 are detachably connected to the saddle this may be arranged by having the stems 15 of the saddle rings 16 pass through suitable holes 14 in the ends 13 of these tug straps or supports and these stems may be removably supported on the saddle in any suitable way as by having their threaded ends engage the metallic nuts or holding members 18 which may be securely held or cemented to the saddle members as by securing them below one or more strips or members 19 of fabric. The cover or body member 20 having an inclined lower edge as indicated, may be secured to the other elements in any suitable way and may be cemented to the support 1 through suitable interposed material, such as 61, which may consist of strips or layers of canvas or other fabric of fibrous material and in this way the support or base 22 of the water hook 21 may be held or cemented in place. These parts of the saddle preferably when the tug strap 7 and saddle ring are removed may be assembled and temporarily held in desired relative position and the various elements cemented together by a heat and pressure treatment sufficient to cure or solidify the phenolic condensation cementing material which they contain. This may be advantageously done in a suitable mould and detachable mould elements may of course fit within the spaces 30 beneath the cover member so that this space is maintained and the adjacent elements properly compressed during this moulding and curing treatment. A temperature of 250° to 320° or so F. is usually sufficient for this heat curing treatment which may be accomplished in an hour more or less, the canvas or other fabric when it contains fifty percent or so of the incorporated cured phenolic condensation cementing material being substantially filled and even surfaced when sufficiently compressed and is not only water-repellant but substantially waterproof as well as greatly strengthened and stiffened. The extent to which such hard curing phenolic condensation cementing material may be incorporated in such a jack saddle element is indicated by the heavy shading of the portions shown in Fig. 1 so that the body of the jack saddle and the adjacent elements including the connecting upper portion or end 13 of the tug strap are rendered relatively rigid and inflexible and are correspondingly strengthened in this way.

The body of the tug strap 7 may in most cases be advantageously impregnated with softer curing phenolic condensation cementing material of the character indicated as is shown in the drawing by the lighter cross hatching of this element. The lower part of this tug strap may be given a looped form 8 so as to form a hole 23 to accommodate and support the shaft end in some cases, and it is also advantageous to incorporate a metal connecting member, such as the connector tube 9 in this part of the strap which can be effectively done by bringing one or more layers of the impregnated fibrous material around this tube as the looped end is made. The ends of these strips or layers of fabric may of course be temporarily held in position by stitching or stapling such as 62 and then this strap or element may be cured preferably in a suitable mould so that the two ends are cured under pressure and positively given the desired form which is usually desirable where such hard curing bakelite varnish or generally similar cementing material is used. One convenient way of connecting the girth or other straps to such supporting members is by the use of a connector link, such as 10 having one of its members passing through such a connector tube 9 and having the other ends after being bent into substantially D form forced through a generally similar connector tube such as 11 securely united to the end of a suitable strap, such as 12. This method may be used to connect the opposite strap end 42 to the tug strap and to similarly connect the girth ends to the cooperating parts indicated.

Another form of construction which has some advantages is shown in Fig. 2 as having the support or tug strap 27 permanently secured to the body of a jack saddle so that this element composed of a number of layers or strips of canvas webbing or other fabric may be carried directly across the saddle and united to the girth support or member 31 through suitably interposed fabric strips 28, 29. The upper portions of these members which may be temporarily stitched, stapled or otherwise secured together may be impregnated with hard curing phenolic condensation cementing material and may serve to support the saddle rings 26 and water hook 21 by enclosing and substantially rigidly supporting the base 22 of the water hook and the base or supporting member 24 to which the stem 25 of the saddle ring is detachably or permanently connected. These parts which are heavily cross hatched may be cured under pressure so as to be securely united and rendered relatively stiff and rigid while the depending portions of these elements may, if desired, be rendered relatively flexible by being more or less coated or impregnated with relatively softer curing phenolic condensation cementing material containing suitable proportions of castor oil or other softening agent. It is of course understood that suitable felt or other pads may be used below the body of the jack saddle and secured thereto in any desired and customary way. As indicated the tug strap member 12 may be similarly connected in this case to its support 27, these connecting parts of the fabric members being, if desired, reenforced and strengthened by carrying large proportions at least of the hard curing phenolic condensation cementing material. The girth member 31 which may be relatively flexible throughout its body portion below the rigid saddle body may have its lower end directly connected to a buckle member 34 of any desired type, the upper portion 33 of which may be inserted in any desired way through a connecting tube 32 mounted in the hard cured reenforced lower end of this member. The corresponding girth strap or member 35 on the other side of the jack saddle may have its end 36 formed with suitable buckle holes 37 where a tongue form of buckle is employed and similar buckle holes 37 may be formed in the end 38 of the strap 42 connected to the tug strap or support on this side of the jack saddle.

As indicated in Figs. 3 and 4, harness straps of this general character may be formed with reenforced buckle holes or members of various forms, such, for instance, as the metallic eyelet arrangement shown comprising an eyelet 51 of steel, brass or other material riveted or flanged tightly around the buckle hole 37 so as to firmly embrace and secure the adjacent fabric portions which may with advantage be impregnated or thoroughly coated with dried hard curing bakelite varnish or similar phenolic condensation cementing material which when cured distributes the strain exerted by this eyelet throughout the body of the strap to better advantage and thus prevents localized weakening or tearing of the fabric. Another arrangement which may be used is to incorporate in the edges of the buckle hole such hard curing phenolic condensation cementing material, together with suitable metallic elements, strips or particles 53, such, for example, as ordinary steel wool which may be forced into the fabric or interspersed between its layers adjacent the buckle hole and then the fabric at this point heavily impregnated with hard curing phenolic condensation cementing material cured preferably under pressure in moulds which may form up the edges of the hole as indicated in Fig. 3. It is not, however, necessary, in all cases to use such additional metallic reenforcing material and as indicated on the left the buckle hole 52 may in some cases where the pressure is not excessive be sufficiently reenforced by impregnating the adjacent parts of the fabric with hard curing phenolic condensation cementing material and curing the same under pressure if desired, and this is also desirable with the free end of the strap to prevent splitting and preserve its form as well as with the connecting end of the strap as indicated by the heavy cross hatching in Fig. 3. As there shown preliminary stitching or stapling 54 may be used to preliminarily connect the ends of these strap tapes or webbing as they are brought around the connecting tube or member, such as 11, the space adjacent this tube being preferably filled with pieces of fabric or fibrous material impregnated with hard curing phenolic condensation cementing material so that on curing preferably under pressure the strap end is heavily reenforced and the metallic connector may be securely held in place so that slipping and wear are greatly minimized or precluded. Fig. 4 shows in greater detail the form of connector link 10 which may be used in this connection, this link of steel or other sufficiently strong metal being passed, for instance, through one connector tube 9 and then its ends 41 being forced toward each other into the ends of a similar tube 11 so that they penetrate it and extend amply therein to prevent accidental withdrawal from this reenforced end 42 of the strap. This gives a sufficiently free movement between the parts where this is desirable and gives a strong and reliable connection by which such a strap member may be connected to other cooperating parts. Fig. 5 shows in greater detail the way in which a number of layers 44 of heavy woven or braided webbing or tape of cotton or other suitable fibrous material may be united to form a strap or element of this general character and suitable for use in harness or other connections. The layers of fabric which may with advantage be previously thoroughly impregnated with suitable phenolic condensation cementing material and then softened by moderate heating, if desired, before being assembled may be stitched together by rows of stitching 49 and this holds them in proper cooperation during the curing processes and in service in case extreme local strain tends to separate the strap layers. Fig. 6 shows another arrangement in which a single wide strip of webbing or fabric 45 is folded upon itself to form a strap or harness element 48, one edge of the fabric 47 being concealed within the strap, if desired, while the other edge 46 may be sewed to the adjacent members by one or more rows of stitching as indicated. Fig. 7 shows another arrangement in which the strap or harness element may be more or less composed of braided, twisted or other cords or small ropes 55 which may be arranged by winding an endless length of such cord around the connector tubes or members and then joining the cord ends and enclosing the whole in a suitable cover fabric as indicated, the edges of which may be connected as by stitching 49 extending also through the body of the strap member at intervals. When all of the parts of such a strap are previously impregnated or heavily coated with phenolic condensation cementing material the elements are permanently and securely united during the curing operation so that the strength of the fibrous material may be greatly increased, especially where the harder curing cementing and strengthening material is employed. It is sometimes desirable to incorporate steel or other wire or woven cloth or strips or tapes in such strap or harness elements to strengthen them and prevent cutting or breakage and this is especially desirable where theft preventing straps, fabrics or connecting devices are desired. For this purpose, the cords 55 may each contain one or more hard steel wires 66 so as to prevent the strap being cut or severed with a knife or other usual instrument. The cured phenolic condensation cementing material in these cords holds the wire therein against relative movement with respect to the fibrous material of the cords so as to minimize or prevent undesirable action thereon. Fig. 8 shows another arrangement in which a series of such metallic reenforcing elements may be incorporated in a strap of this general character. One or more thin steel strips or ribbons 57 generally resembling watch springs may, if desired, be enclosed in a thin sheet or layer of cloth or other fabric 59 preferably impregnated with hard curing phenolic condensation cementing material and this may be cured under pressure so as to form a composite reenforcing element in which the metallic reenforcements are securely cemented which may also if desired contain a series of separated or braided wires 58 at other portions. A thin reenforcing strip or element of this character may be made only a sixty-fourth of an inch or less thick so as not to undesirably affect the flexibility of the strap and this element may be incorporated between several layers of webbing or other fabric 65, 67, which may be impregnated with phenolic condensation cementing material preferably of the softer curing or flexible varieties. These parts may, if desired, be stitched or attached by the stitching 49 so as to draw them closely together and then they may be cured so as to cement the parts in desired position and strengthen and waterproof them.

This invention has been described in connection with a number of illustrative embodiments, forms, proportions, elements, parts, shapes, materials, compositions, and methods of preparation, production and use, to the details of which disclosure the invention is not of course to be limited, since what is claimed as new and what is desired to be secured by Letters Patent is set forth in the appended claims:

1. The jack saddle comprising a body formed of a plurality of layers of canvas fabric and connected supporting strap members formed of a plurality of fabric layers, said fabric enclosing metallic members comprising supporting parts of the saddle rings and water hook, the fabric members in the top part of said jack saddle carrying and being impregnated with cured hard curing phenolic condensation cementing and strengthening material securely uniting and stiffening said elements and the body of the copending strap supporting members being flexible and carrying cured soft curing phenolic condensation cementing material strengthening and waterproofing the fabric of such members.

2. The jack saddle comprising a body formed of a plurality of layers of fabric and connected supporting strap members formed of a plurality of fabric layers, said fabric enclosing metallic members, the fabric members in the top part of said jack saddle carrying and being impregnated with cured hard curing phenolic condensation cementing and strengthening material securely uniting and stiffening said elements and portions of the depending strap supporting members being flexible and carrying cured soft curing phenolic condensation cementing material strengthening and waterproofing the fabric of such members.

3. The jack saddle harness element comprising a body formed of fibrous material comprising cotton and connected supporting strap members formed of a plurality of fabric layers, said fibrous material enclosing metallic members and being impregnated with cured hard curing phenolic condensation cementing and strengthening material securely uniting said elements and the body of the depending strap supporting members being flexible and carrying cured soft curing phenolic condensation cementing material strengthening and waterproofing the fabric.

4. The harness element comprising a body formed of fibrous material and connected supporting strap members formed of fabric, said fibrous material being impregnated with cured hard curing phenolic condensation cementing and strengthening material securely uniting said elements and the body of the depending strap supporting members being flexible.

5. The harness element comprising a substantially rigid body formed of a plurality of layers of fabric and connected strap members formed of a plurality of fabric layers, the body fabric carrying cured hard curing phenolic condensation cementing and strengthening material securely uniting said elements and the body of the connected strap members being flexible and carrying cured soft curing phenolic condensation cementing material.

6. The harness element comprising a substantially rigid body formed of fabric and connected members formed of fabric, the body fabric carrying cured hard curing phenolic condensation cementing and strengthening material securely uniting said elements and the body of the connected members being flexible and carrying cured soft curing phenolic condensation cementing material.

7. The harness element comprising a substantially rigid body formed of fabric and connected members formed of fabric, the body fabric carrying cured hard curing phenolic condensation cementing and strengthening material securely uniting said elements and the body of the connected members being flexible and carrying cured soft curing phenolic condensation cementing material and metallic connecting devices embedded in said members.

8. The harness strap comprising a number of layers of woven cotton webbing impregnated with phenolic condensation cementing material and stitched together, a connector tube incorporated in one end of said member and enclosed within a loop in the layers of fabric, there being metallic reenforced buckle holes formed in said strap portions of said strap adjacent said connector tube and adjacent said buckle holes carrying large proportions at least of hard curing phenolic condensation cementing material to reenforce and strengthen the same.

9. The harness strap comprising a number of layers of fabric impregnated with phenolic condensation cementing material, a connector incorporated in one end of said member and enclosed within a loop in the layers of fabric, there being buckle holes formed in said strap, portions of said strap adjacent said connector and adjacent said buckle holes carrying large proportions at least of hard curing phenolic condensation cementing material to reenforce and strengthen the same.

10. The harness strap comprising a number of layers of fabric impregnated with phenolic condensation cementing material, a connector incorporated in one end of said member, portions of said strap carrying large proportions at least of hard curing phenolic condensation cementing material to reenforce and strengthen the same.

11. The harness element having a body comprising a number of layers of fabric carrying soft curing phenolic condensation cementing material, a connector tube incorporated in one end of said member and enclosed within a loop in the layers of fabric, connecting portions of said member adjacent said connector tube carrying large proportions at least of hard curing phenolic condensation cementing material to reenforce and strengthen the same.

12. The harness element having a body comprising a number of layers of fabric carrying soft curing phenolic condensation cementing material, a connector device incorporated in said member, connecting portions of said member adjacent said connector device carrying large proportions at least of hard curing phenolic condensation cementing material to reenforce and strengthen the same.

13. The harness element having a body comprising fabric carrying soft curing phenolic condensation cementing material, portions of said member carrying large proportions at least of hard curing phenolic condensation cementing material to reenforce and strengthen the same.

14. The strap comprising a number of layers of webbing impregnated with soft curing phenolic condensation cementing material and stitched together, there being metallic reenforced buckle holes formed in said strap, portions of said strap adjacent said buckle holes carrying large proportions at least of hard curing phenolic condensation cementing material to reenforce and strengthen the same.

15. The strap comprising fibrous material impregnated with soft curing phenolic condensation cementing material, there being buckle holes formed in said strap, portions of said strap adjacent said buckle holes carrying large proportions at least of hard curing phenolic condensation cementing material to reenforce and strengthen the same.

16. The strap comprising fibrous material impregnated with phenolic condensation cementing material, a metallic reenforcing member in said strap, connecting portions of said strap adjacent said reenforcing member carrying large proportions at least of hard curing phenolic condensation cementing material to reenforce and strengthen the same.

17. The strap comprising fibrous material, a metallic reenforcing member in said strap, connecting portions of said strap adjacent said reenforcing member carrying large proportions at least of hard curing phenolic condensation cementing material to reenforce and strengthen the same.

18. The harness element comprising fibrous material, a metallic reenforcing member in said harness element, connecting portions of said harness element adjacent said reenforcing member carrying large proportions at least of hard curing phenolic condensation cementing material to reenforce and strengthen the same.

19. The strap comprising fibrous material and formed with holes, portions of said strap adjacent said holes carrying hard curing phenolic condensation cementing material in larger proportions than other parts of said strap to reenforce and strengthen such hole portions of said strap.

20. The strap comprising fibrous material, portions of said strap carrying hard curing phenolic condensation cementing material in larger proportions than other parts of said strap to reinforce and strengthen such portions.

HENRY C. EGERTON.